3,372,074
MANUFACTURE OF LAMINATED
SAFETY GLASS
Aime Louis Rocher, Sainte-Colombe-les-Vienne, and
Henri Rhety, Venissieux, France, assignors to
Rhone-Poulenc S.A., Paris, France, a corporation of France
No Drawing. Filed June 12, 1964, Ser. No. 374,817
4 Claims. (Cl. 156—106)

ABSTRACT OF THE DISCLOSURE

The adhesion of plasticized polyvinyl butyral to glass sheets in the production of safety glass laminates is improved by conditioning the polyvinyl butyral in an atmosphere substantially saturated with water vapour or the vapour of an aqueous volatile acid.

---

This invention relates to the manufacture of laminated safety glass.

It is known to manufacture safety glass consisting of two glass sheets between which there is a shock-resistant plastic reinforcement bonded to the glass sheets. When such safety glass is subjected to shocks, the glass sheets break, but the splinters formed remain bonded to the plastic sheet, which is not itself broken by the shock, and consequently no injury can be cause by flying glass splinters. Of course, for such glass to be really effective the adherence of the plastic reinforcement to the glass sheets must be excellent.

In the safety glasses at present employed, notably for glazing the windows of automotive vehicles, the plastic reinforcement generally consists of a sheet of plasticised polyvinyl butyral. Now, it sometimes happens that, in the production of safety glasses, the plastic reinforcement adheres insufficiently to the glass so that shocks may cause the glass splinters to become detached and cause injuries. This defect is the more serious in that it cannot be detected by any examination of the finished safety glasses, other than an impact test.

It has already been proposed to improve the adherence of the polyvinyl butyral to the glass by incorporating various additives in the plastic sheet more especially silicic esters of low volatility in a proportion up to 2.5% of the weight of the plastic sheet (see application Serial No. 94,165, filed on March 8, 1961, now Patent No. 3,202,568, issued August 24, 1965). By this method, a safety glass is obtained which gives highly satisfactory results when subjected to the steel ball impact test.

It has since been found that it is possible to increase the adhesiveness of the plasticised polyvinyl butyral sheet to the glass by conditioning the said sheet in a neutral or slightly acid, moisture-saturated atmosphere. The invention accordingly provides a process for the production of safety glass which comprises interposing between two sheets of glass a sheet of plasticised polyvinyl butyral which has been conditioned in an atmosphere substantially saturated with water vapour or the vapour of an aqueous volatile acid (as hereinafter defined), and causing the said conditioned sheet of polyvinyl butyral to adhere to the sheets of glass by heat and pressure. The conditioning may be effected in an atmosphere saturated as aforesaid in a period of a few hours to as much as one week, preferably from one to four days.

The volatile acids which can be used must have a strength and volatility such that the pH of the polyvinyl butyral sheet after conditioning in the vapour of the said acid is less than 7 (as determined by a paper indicator in contact with the said sheet). The preferred such acids are hydrochloric, nitric, and formic acids.

It is preferred to combine the new process with that described in our aforesaid application Serial No. 94,165. That is to say, the polyvinyl butyral sheet preferably contains up to 2.5% by weight of a silicic acid ester of an organic aliphatic alcohol having 3 to 6 carbon atoms in the molecule or of a silicic acid ester of an ether of ethylene glycol. The preferred such ester is butyl silicate.

For ease in handling, the polyvinyl butyral sheets should preferably contain at most 2% by weight of polyvinyl acetate, as larger amounts are liable to cause tackiness.

The following example illustrates the invention.

EXAMPLE

Three sets of polyvinyl butyral sheets 0.5 mm. thick having the following composition are conditioned for four days at 20–22° C.:

|  | Percent by weight |
|---|---|
| Commercial polyvinyl butyral | 75 |
| Triethyleneglycol diethylacetate | 23 |
| Butyl silicate | 2 |

The percentage composition of the commercial polyvinyl butyral employed is as follows:

| True polyvinyl butyral | 79.8 |
|---|---|
| Polyvinyl alcohol | 20 |
| Polyvinyl acetate | 0.2 |

The three sets are conditioned respectively in a normal atmosphere (relative humidity about 40%), a moisture saturated atmosphere (relative humidity 100%), and an atmosphere obtained by placing an open vessel containing 20% by weight hydrochloric acid solution in the enclosed space containing the sheets.

The identical sets of polyvinyl butyral sheets plasticised in the same way but containing no butyl silicate are conditioned in the same way.

The conditioned sheets are then assembled between two glass sheets 2.5 mm. thick by the method described in British specification No. 755,809, by heating first in vacuo and then under pressure. Laminated sheets of safety glass measuring 30 cm. by 30 cm. are thus obtained. They are subjected to the impact test (in which a steel ball weighing 1 kg. falls from a height of 1.50 m. onto a specimen of the safety glass measuring 30 x 30 cm. held in a frame), and the results are expressed in accordance with the following scale of adherence:

0=nil
2=poor
4=medium
6=good
8=very good
10=excellent

A rating of 10 is accorded to an assembly which, after the impact of the ball, exhibits no detachment or splintering on either of the faces, and the rating 0 to an assembly which exhibits numerous and considerable detachments of glass splinters around the point of impact of the ball.

The experimental results are given in the following table.

the pH of the said polyvinyl butyral sheet is brought to less than 7.

TABLE

| | Characteristics of the conditioning atmosphere | | |
|---|---|---|---|
| | Relative humidity 40% | Relative humidity 100% | Atmosphere in equilibrium with a 20% hydrochloric acid solution |
| Polyvinyl butyral sheet containing no butyl silicate. | Adherence=0. Glass entirely detached at the point of impact of the ball. | Adherence=2. Glass partially detached at the point of impact of the ball, many splinters. | Adherence=4 to 6. Few splinters detached at the point of impact of the ball. |
| Polyvinyl butyral sheet containing butyl silicate. | Adherence=6. One splinter detached at the point of impact of the ball. | Adherence=8. No splinters detached at the point of impact of the ball. | Adherence=10. No splinters detached at the point of impact of the ball, no splinters detachable by hand. |

It is apparent from this table that the best results are obtained when the polyvinyl butyral sheet containing a silicate is conditioned in the atmosphere in equilibrium with the acid solution. The 20% hydrochloric acid solution may be replaced by aqueous nitric acid of the same strength or 90% by weight aqueous formic acid, and the same results are obtained.

We claim:

1. In a process for the production of safety glass by interposing between two sheets of glass a sheet of plasticized polyvinyl butyral, and then causing the said sheet of polyvinyl butyral to adhere to the two sheets of glass to form a laminate by heat and pressure, the improvement which consists in interposing between the two sheets of glass a sheet of plasticized polyvinyl butyral which has been subjected to an atmosphere substantially saturated with the vapours of an aqueous volatile acid such that the pH of the said polyvinyl butyral sheet is brought to less than 7.

2. The improvement of claim 1 in which the aqueous volatile acid is selected from the group consisting of aqueous hydrochloric, nitric and formic acid.

3. The improvement of claim 1 in which the plasticized polyvinyl butyral sheet contains up to 2.5% by weight of a silicic ester of an organic aliphatic alcohol of 3 to 6 carbon atoms or of an ether of ethylene glycol.

4. The improvement of claim 3 in which the silicic ester is butyl silicate.

References Cited

UNITED STATES PATENTS 3,231,461   1/1966   Mattimoe _____ 161—199

ROBERT F. BURNETT, *Primary Examiner.*

ALEXANDER WYMAN, *Examiner.*

W. J. VAN BALEN, *Assistant Examiner.*